(12) United States Patent
Tang (10) Patent No.: US 8,237,810 B2
(45) Date of Patent: Aug. 7, 2012

(54) IMAGE PROCESSING APPARATUS AND METHOD

(75) Inventor: Pei-Chong Tang, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 520 days.

(21) Appl. No.: 12/424,553

(22) Filed: Apr. 16, 2009

(65) Prior Publication Data

US 2009/0262212 A1 Oct. 22, 2009

(30) Foreign Application Priority Data

Apr. 17, 2008 (CN) .......................... 2008 1 0301183

(51) Int. Cl.
*H04N 5/228* (2006.01)
(52) U.S. Cl. .................................... 348/222.1
(58) Field of Classification Search .................. 348/125, 348/133, 222.1, 246, 251, 207.99, 231.99, 348/231.9, 262, 323; 382/260
See application file for complete search history.

(56) References Cited

U.S. PATENT DOCUMENTS

| | | | | |
|---|---|---|---|---|
| 5,408,338 | A | * | 4/1995 | Koike .......................... 358/448 |
| 6,070,800 | A | * | 6/2000 | Fujita et al. .............. 235/462.11 |
| 6,307,588 | B1 | * | 10/2001 | Olson et al. ................ 348/222.1 |
| 7,221,795 | B2 | * | 5/2007 | Nakagawa .................... 382/176 |
| 2003/0113019 | A1 | * | 6/2003 | Nakagawa .................... 382/187 |

* cited by examiner

*Primary Examiner* — David Ometz
*Assistant Examiner* — Ahmed A Berhan
(74) *Attorney, Agent, or Firm* — Altis Law Group, Inc.

(57) ABSTRACT

An image processing apparatus includes a reader, a plurality of matrix modules, a selector, and a controller. The reader is configured for reading data of each pixel of a binarized image. The plurality of matrix modules is configured for performing filtering operations to the data based on a control signal, the plurality of matrix modules serially connected, and a first one of the series being connected to the reader. The selector is configured for selecting one of the plurality of matrix modules based on the control signal and outputting filtered results from the selected one of the plurality of matrix modules. The controller is configured for generating the control signal. An image processing method is also provided.

16 Claims, 8 Drawing Sheets

IMAGE PROCESSING APPARATUS AND METHOD

BACKGROUND

1. Technical Field

The present disclosure relates to an image processing apparatus and an image processing method.

2. Description of Related Art

Numerous image processing methods are currently available for flaw detection and elimination in images. Most general image processing method comprises the following steps: digitizing the original image to form a bit map; binarizing the bit map using threshold parameters and assigning 1's and 0's accordingly, so as to form a binarized image; performing swelling-shrinking operations on the binarized image to filter out spots or fill in gaps therein. In practice, the "1" pixels will be shown as a black pixel and the "0" pixels will be shown as a white pixel.

Figure 5:
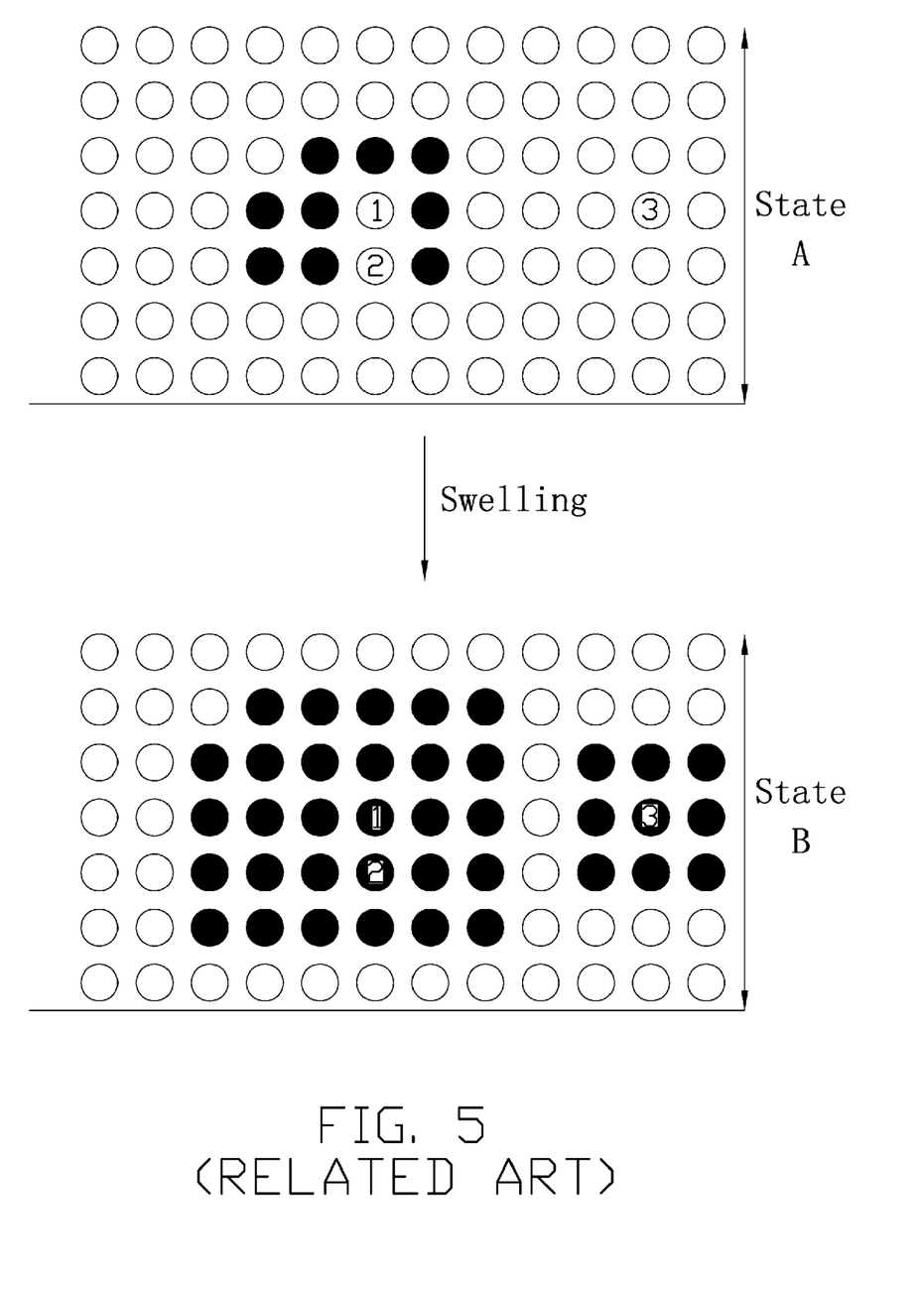
FIG. 5 is a schematic diagram of a related art showing a binarized image converted from state "A" to state "B".
Figure 6:
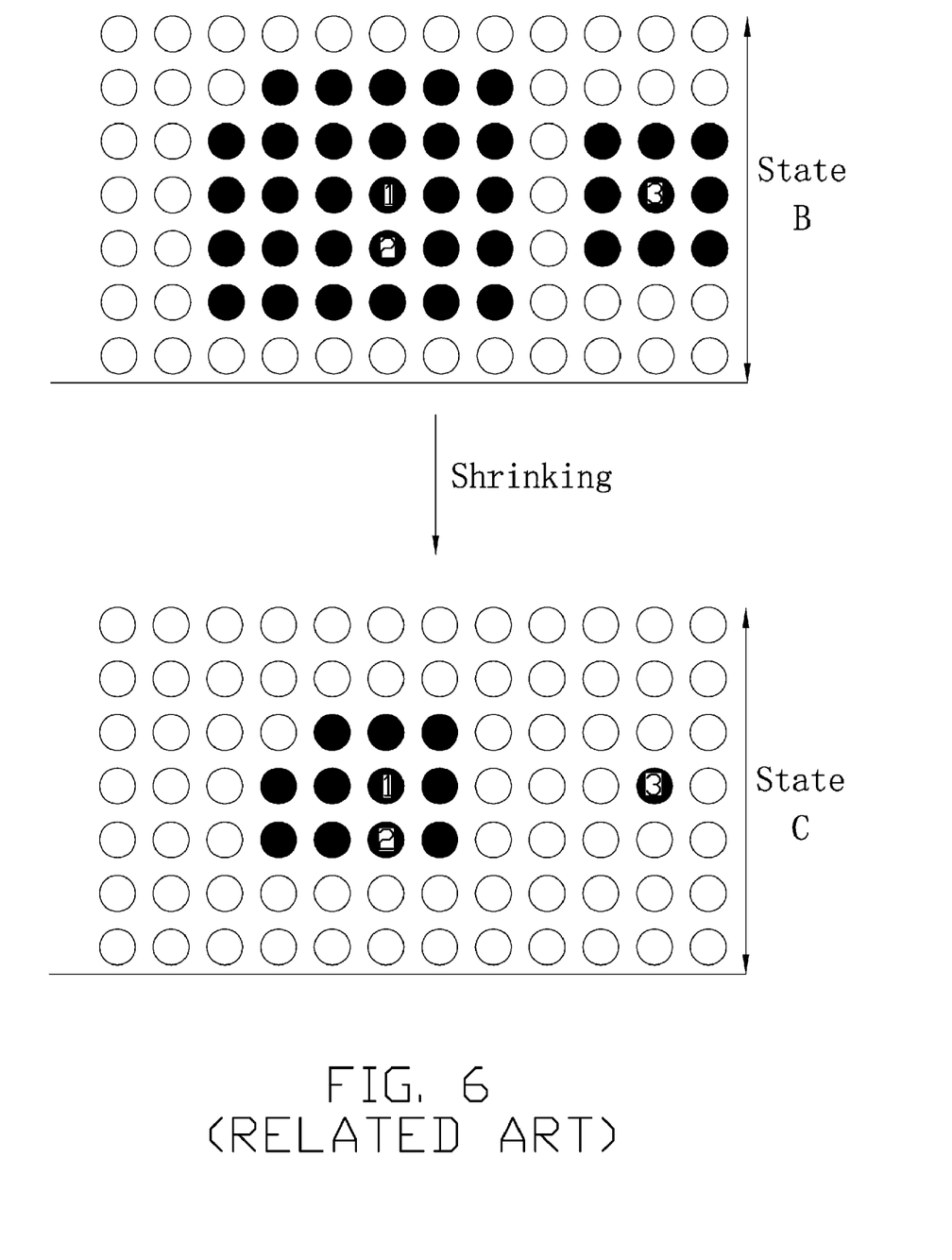
FIG. 6 is a schematic diagram of the related art showing the binarized image converted from state "B" to state "C".

Referring to FIGS. 5 and 6, in state "A", a binarized image includes a foreground and a background. The two pixels "1" and "2" make up a gap in the foreground and a pixel "3" is a spot in the background. In order to fill the gap "1" and "2", a swelling operation is performed by using a 3*3 window applied to each black pixel, thus a first swelled-binarized image is shown in state "B". After that, a shrinking operation is performed by using the 3*3 window to constrict the swelled-binarized image in state "B", thus a first shrunk-binarized image is shown in state "C". Therefore, the gap "1" and "2" is filled by first swelling and second shrinking the binarized image.

Figure 7:
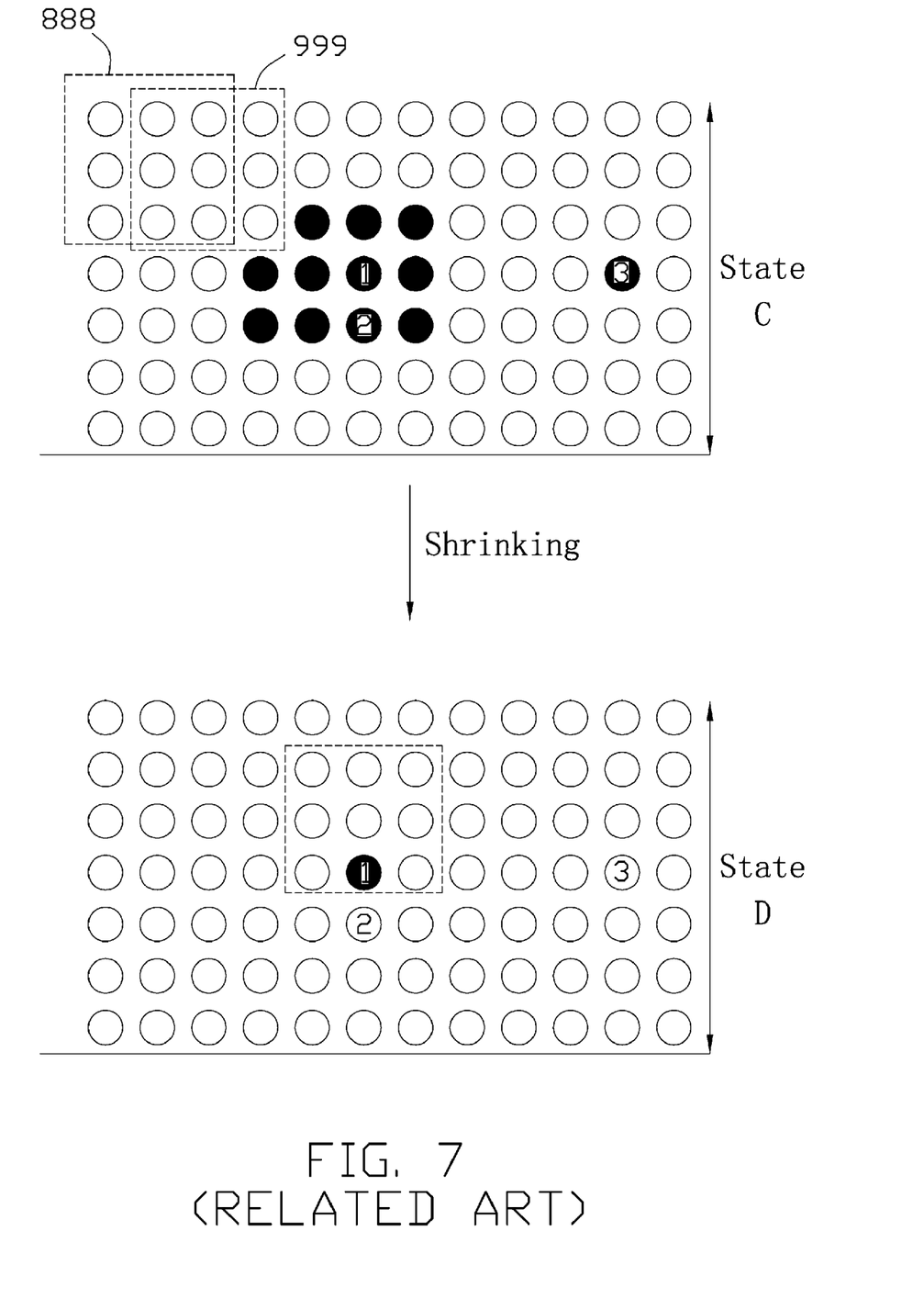
FIG. 7 is a schematic diagram of the related art showing the binarized image converted from state "C" to state "D".
Figure 8:
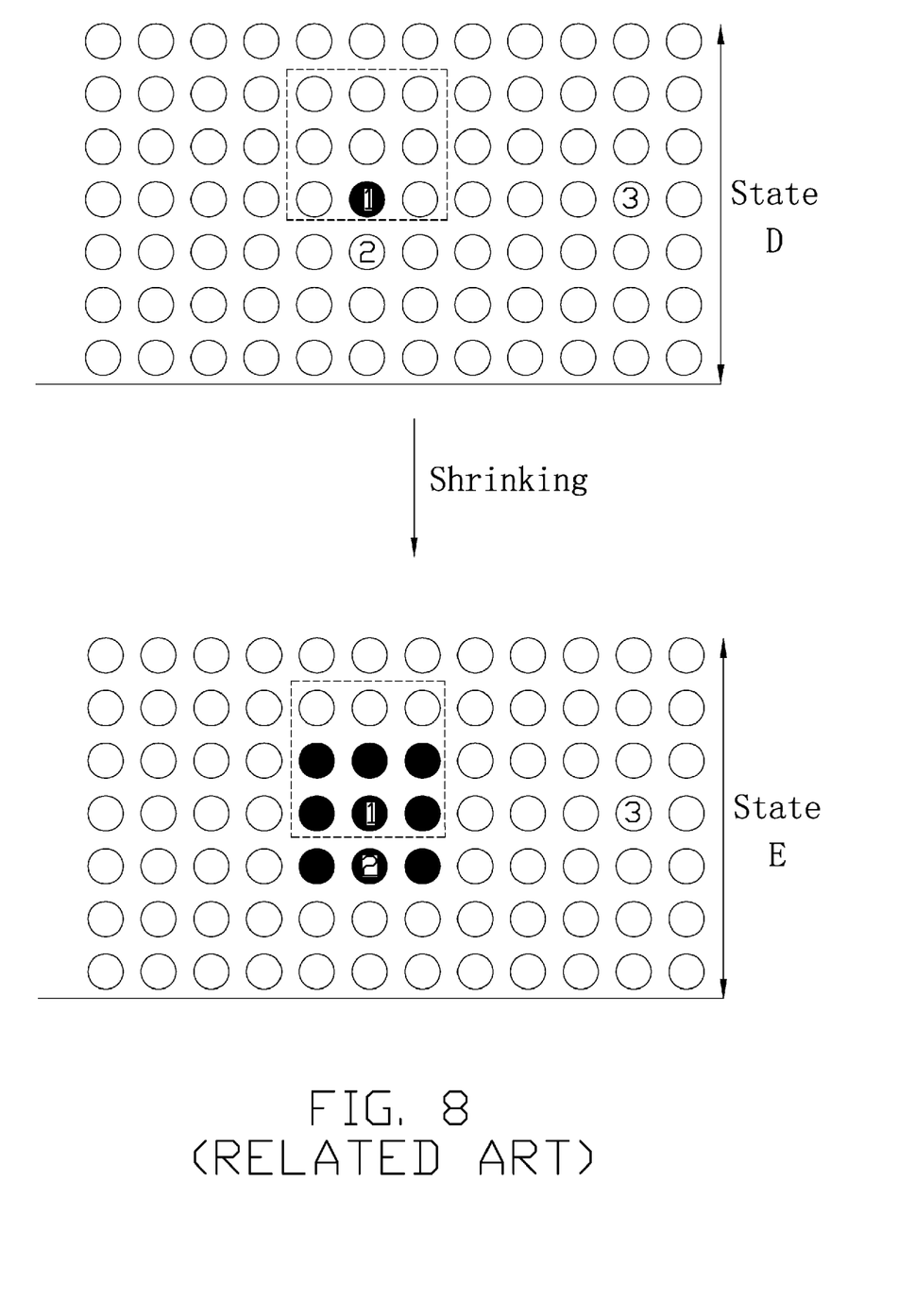
FIG. 8 is a schematic diagram of the related art showing the binarized image converted from state "D" to state "E".

Further referring to FIGS. 7 and 8, in state "C", there is still the spot "3" in the background. Another shrinking operation is also performed to the first shrunk-binarized image in state "C", thus a second shrunk-binarized image is shown in state "D" in which the spot "3" is filtered out. After that, another swelling operation is also performed to the second shrunk-binarized image, and a second swelled-binarized image is generated.

In practice, the image processing method requires that first data of each pixel and its adjacent 8 pixels is read, and then the data is processed by software to perform the swelling-shrinking operations. However, during one step, i.e. one pulse time, data of only one pixel can be read, thus it will cost much time to accomplish the processing. For example, when a processing procedure including one swelling operation and one shrinking operation is used to process a 1024*768 bits image, at least 1024*768*3*3*2 steps to read data must be performed.

Therefore, an image processing apparatus and an image processing method are needed in the industry to address the aforementioned deficiency.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION

Figure 1:
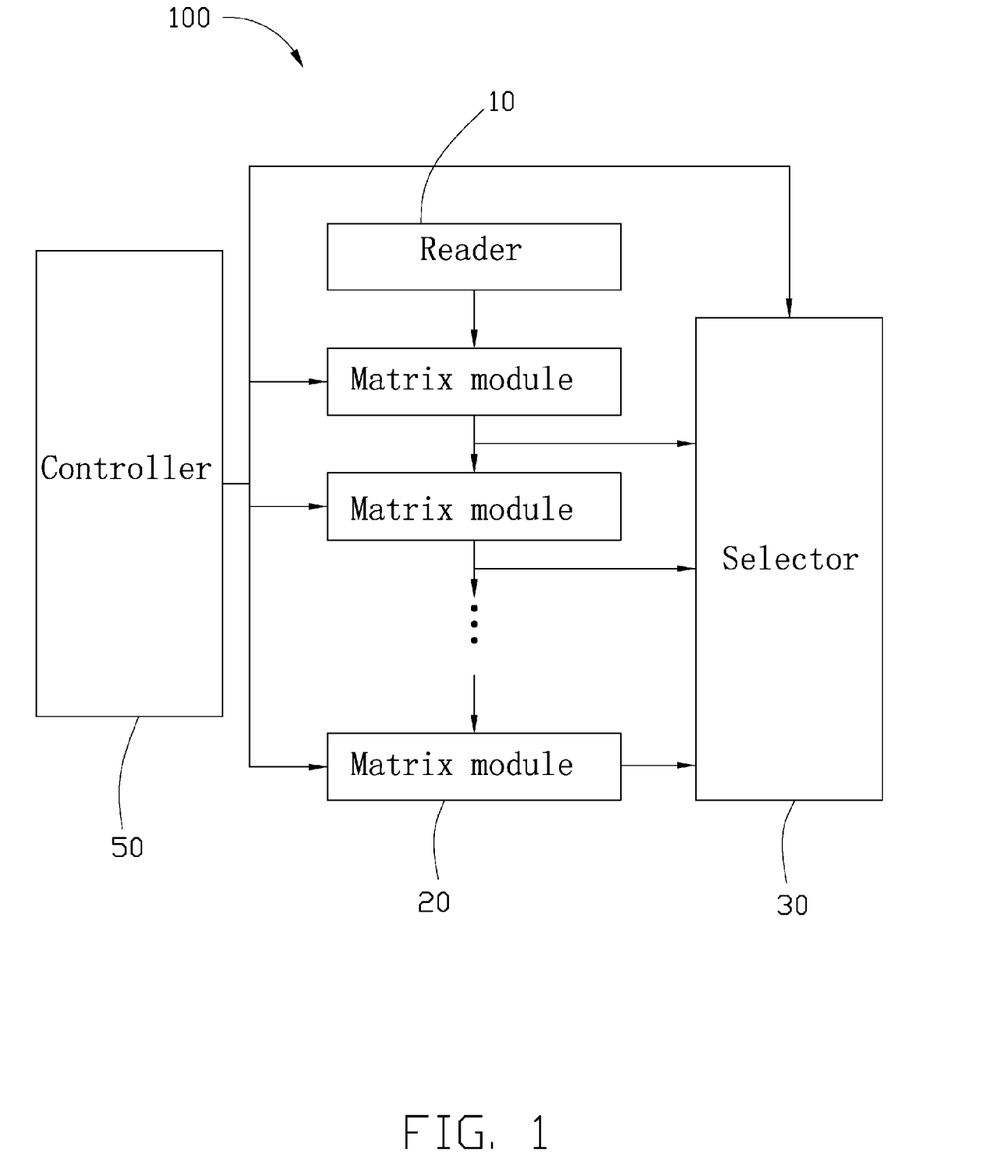
FIG. 1 is a schematic diagram showing an image processing apparatus in accordance with an exemplary embodiment, the image processing apparatus including a matrix module.

Referring to FIG. 1, an image processing apparatus 100 in accordance with an exemplary embodiment is used to filter flaws from images. In practice, the image processing apparatus 100 may be a desktop computer or a notebook computer. The image processing apparatus 100 includes a reader 10, a plurality of matrix modules 20, a selector 30, and a controller 50. The matrix modules 20 are connected in series, and the first matrix module 20 at the beginning of the series of the matrix modules 20 is connected to the reader 10. Input terminals of the matrix modules 20 are connected to the controller 50, while output terminals are connected to the selector 30. The selector 30 is connected to the controller 50.

The reader 10 reads the data associated with each pixel of a binarized image. The matrix modules 20 perform filtering operations, such as a swelling operation or a shrinking operation, to the data based on a control signal, and output filtered results to the selector 30. The selector 30 selects one of the matrix modules 20 based on the control signal and receives the filtered results from the selected matrix module, and then determines a total number of filtering operations and a length N of an N*N window that will be used in the filtering operations. The controller 50 generates the control signal.

In this embodiment, the control signal is a binary string including upper bits and lower bits. The upper bits are used to control the selector 30 while the lower bits are used to control the matrix modules 20. Each bit of the lower bits corresponds to a matrix module 20. The upper bits compose a binary-coded decimal (BCD) code that can identify each matrix module 20. Each bit of the lower bits is used to control a corresponding matrix module 20 to perform corresponding filtering operations, i.e. the swelling operation or the shrinking operation. Therefore, the number of the bits of the control signal depends on the total number of matrix modules 20.

As an example to explain the present embodiment, eight matrix modules 20 will be used. To address eight matrix modules the control signal must be an eleven bit signal in SSS,XXXX,XXXX format. "SSS" is read by the selector 30 to select one of the matrix modules 20 and also to output filtered results of the selected matrix module 20, for instance, if the bits SSS are "011", the fourth matrix module 20 in the series of the matrix modules 20 is indicated and the filtered result of the fourth matrix module 20 will be outputted from the selector 30. Each "X" is used to control a particular matrix module 20 to perform corresponding filtering operations, i.e. the swelling operation or the shrinking operation. For instance, if "X" is "1", a corresponding matrix module 20 performs the swelling operation, and if "X" is "0", the corresponding matrix module 20 performs the shrinking operation.

The control signal may be "011, 1001, XXXX", wherein "011" means that the fourth matrix module 20 should be selected and the filtered result of the fourth matrix module 20 will be output from the selector, and "1001" means that the first and fourth matrix modules 20 perform the swelling operations, the second and third matrix modules 20 perform the shrinking operations. The remaining X's representing modules 20 are not needed for the current operation and are ignored and power may not be supplied to the corresponding modules 20.

Figure 2:
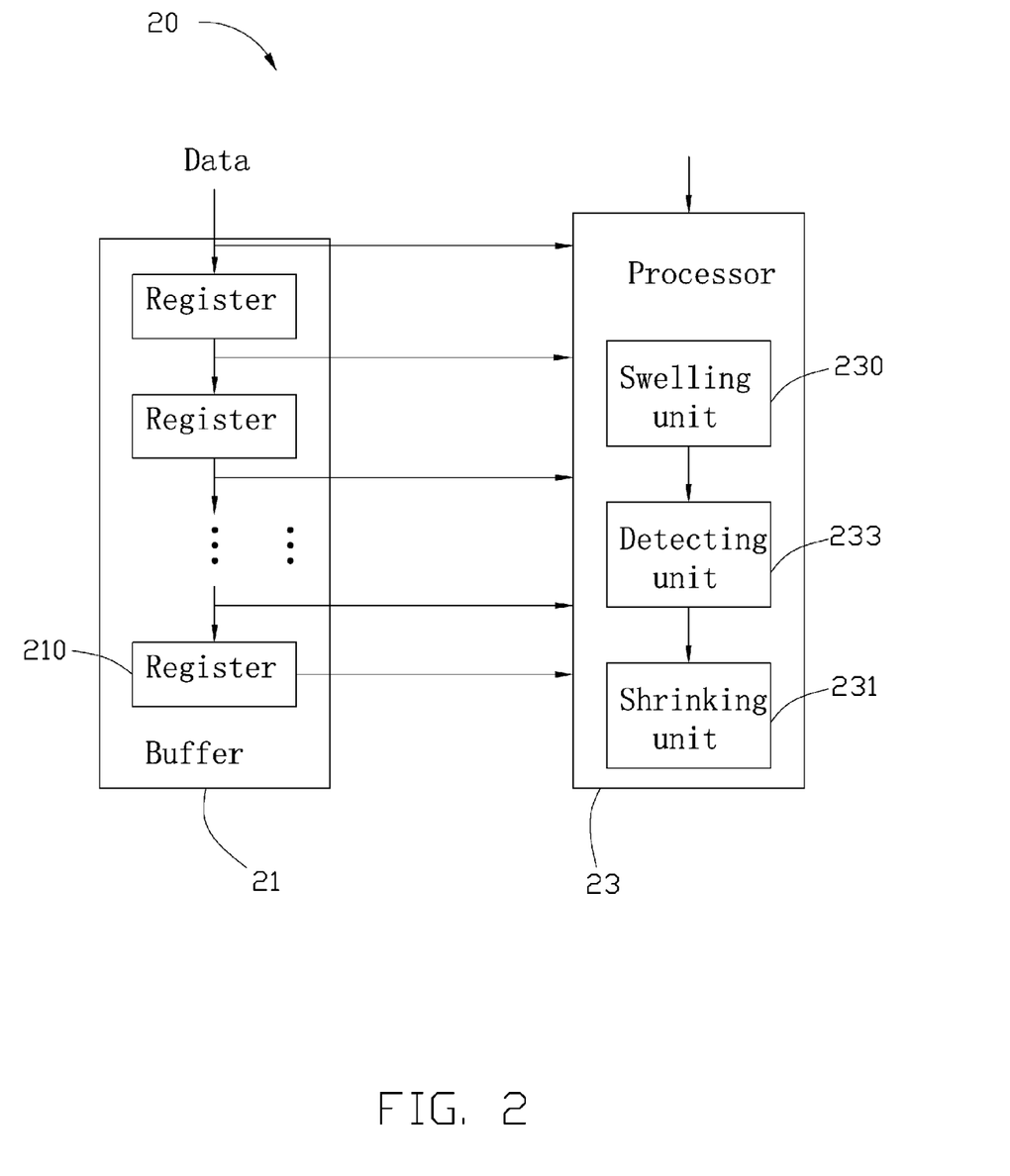
FIG. 2 is a schematic diagram showing the matrix module in accordance with an exemplary embodiment.

Referring to FIG. 2, a matrix module 20 includes a buffer 21 and a processor 23. The buffer 21 includes a series of registers 210. Each register 210 is used for storing data of a pixel temporarily and sends the data to a next register 210 after a read step, i.e. a pulse time, of the reader 10.

The processor 23 includes a swelling unit 230, a shrinking unit 231, and a detecting unit 233. The swelling unit 230 is used for performing the swelling operation on the data associated with each pixel. The shrinking unit 231 is used for performing the shrinking operation on the data associated with each pixel. The detecting unit 233 is used for detecting the control signal, and enabling one of the swelling unit 230 and the shrinking unit 231 based on a detecting result.

There are two types of the matrix module 20. The second type has one register more than the first type which uses the reader as a register. In the embodiment, the first type is used. More details are described below.

The binarized image of state "C" shown in FIG. 7 is used as an example to be processed by the image processing apparatus 100. This is a 12*7 image. In order to use a 3*3 window to process the image, 26 registers 210 are needed in the buffer 21. The 26 registers 210 and the reader 10 can temporarily store data of 27 (12*2+3) pixels. As to the second type, 27 registers 210 should be used and the reader 10 will not be used as a register.

In operation, the reader 10 reads data from left to right and from top to bottom of the binarized image, therefore, the read operation of the reader 10 starts from the first pixel at the top left corner. The reader 10 also sends the data to the registers 210 of the buffer 21, and the data will be transferred from one of the registers 210 to next one. The transfer operation will not be stopped until the data of the first pixel is received by the 26th register 210.

When the transfer operation is stopped, the data of the 1st, 2nd, 3rd pixels are respectively stored in the 26th, 25th, 24th registers 210, the data of the 13th, 14th, 15th pixels are respectively stored in the 14th, 13th, 12th registers 210, the data of the 25th, 26th, 27th pixels are respectively stored in the 2nd, 1st, registers 210 and the reader 10. In this case, the 1st, 2nd, 3rd, 13th, 14th, 15th, 25th, 26th, 27th pixels compose a first 3*3 window 888 in the binarized image. At the next read step, the data temporarily stored in the 26 registers 210 and the reader 10 are sent to the processor 23. That is, the processor 23 can receive and process the data of the first 3*3 window 888 in the binarized image at the same time. Subsequently, the 26 registers 210 and the reader 10 temporarily store data of 2nd-28th pixels, and then the processor 23 receives and processes the data of a second 3*3 window 999. In this way, all pixels of the binarized image will be processed using 3*3 windows. Because the processor 23 can process a 3*3 window of the pixels in one read step and doesn't need to process the pixels one by one, a great deal of time is saved.

To avoid using an excessive number of registers to process, a binarized image with 1024*768 pixels instead of using at least 2050 (1024*2+2) registers 210 included in the buffer 21, a matrix module 40 of another embodiment may be used which is described next.

Figure 3:
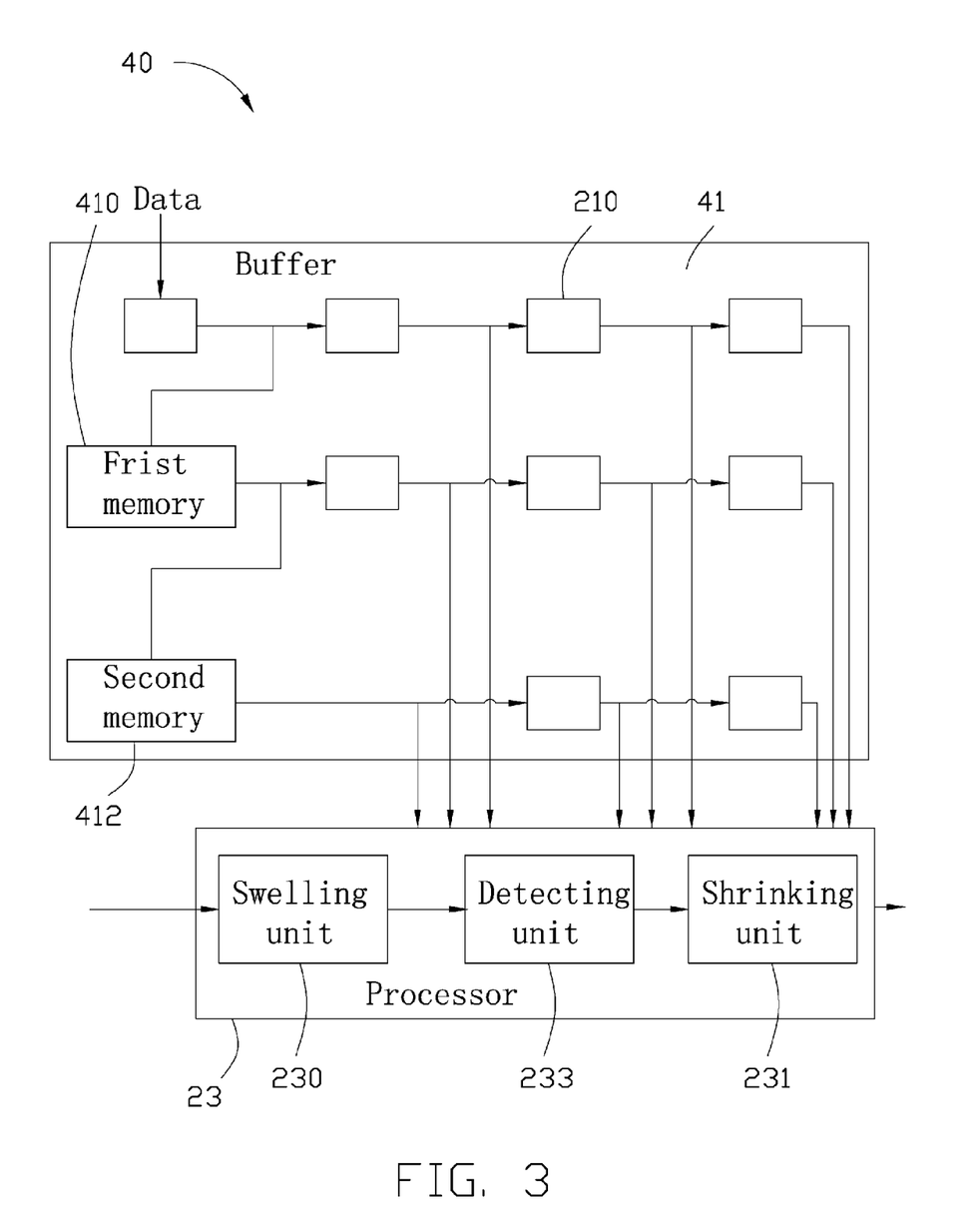
FIG. 3 is a schematic diagram showing the matrix module in accordance with another exemplary embodiment.

Also referring to FIG. 3, a matrix module 40 in accordance with another embodiment is illustrated to solve the aforementioned problem. In comparison with the matrix module 20, the matrix module 40 uses a first memory 410 and a second memory 412 to replace some of the registers 210. In detail, a first group of registers 210 are serially connected between the reader 10 and the processor 23, and a second group of registers 210 are serially connected between the first memory 410 and the processor 23, and a third group of registers 210 are serially connected between the second memory 412 and the processor 23. The first memory 410 and the second memory 412 are serially connected between the processor 23 and a first register 210, of the first group of registers 210, directly connected to the reader 10. In addition, the three groups of registers 210 except the first register of the first group are connected to the processor 23. Each one of the first memory 410 and the second memory 412 works as a group of N registers, herein the number N equals one plus the total number of pixels of a row of the binarized image.

When the matrix module 40 is used to process the binarized image of state "C" shown in FIG. 7, the first memory 410 and the second memory 412 work respectively as a group of 13 registers. When processing the first 3*3 window 888, the buffer 40 outputs the data of the 3rd, 15th, 27th, 2nd, 14th, 26th, 1st, 13th, 25th pixels from left to right. When matrix module 40 is used to process a binarized image with 1024*768 pixels, the first memory 410 and the second memory 412 work respectively as a group of 1025 registers. Therefore, a comparative small volume is acquired.

Figure 4:
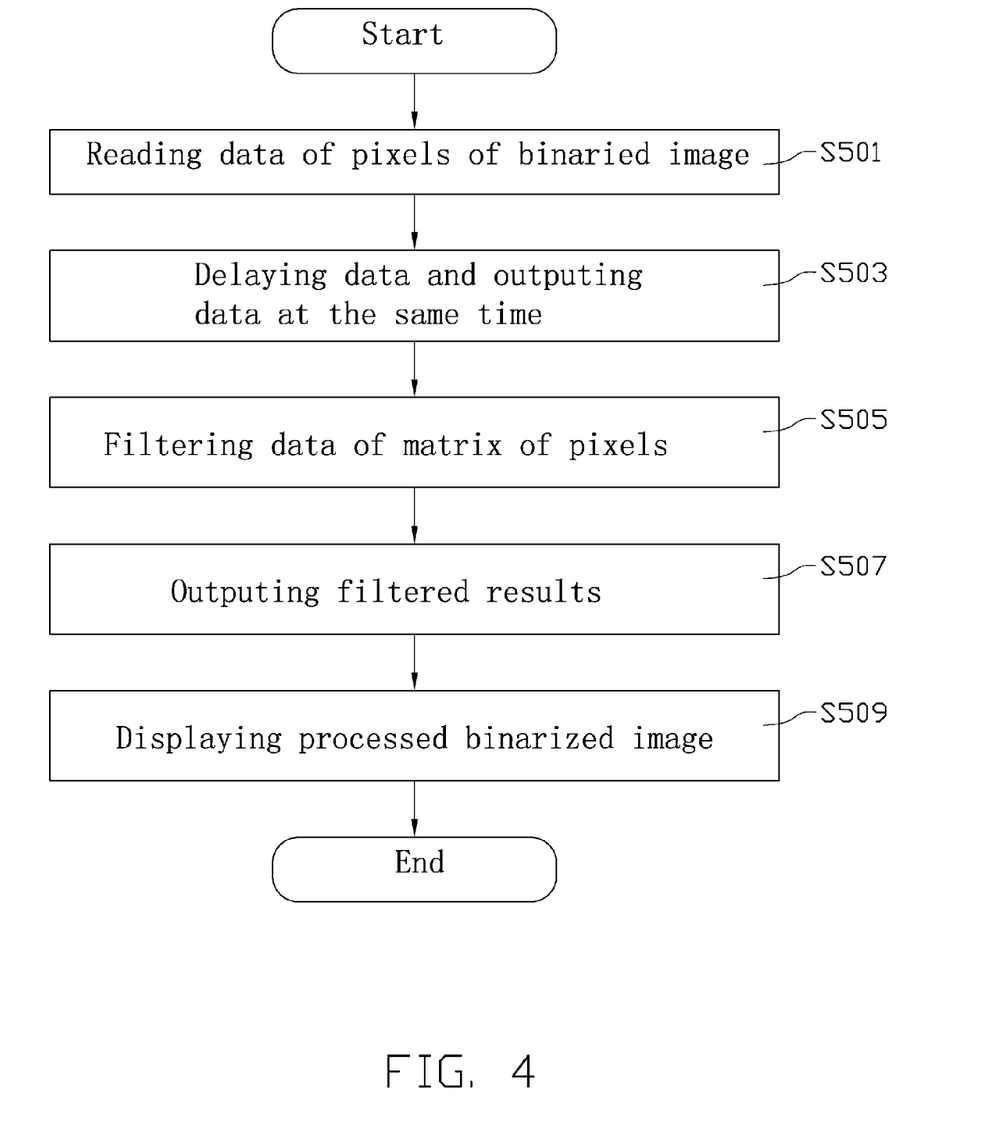
FIG. 4 is a chart flow showing an image processing method in accordance with an exemplary embodiment.

Referring to FIG. 4, an image processing method in accordance with an exemplary embodiment is used to filtering and reshaping images. The image processing method can be performed by a computer or a SCM such as the image processing apparatus 100.

In step S501, reading data of a plurality of pixels of a binarized image one by one.

In step S503, delaying the data of the plurality of pixels and outputting the data at the same time.

In step S505, filtering the data of a matrix of pixels of the plurality of pixels. In general, the matrix of pixels often uses a 3*3 window standard.

In step S507, outputting filtered results.

In step S507, displaying the processed binarized image based on the filtered results to users.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An image processing apparatus comprising:
a reader configured for reading data of each pixel of a binarized image;
a plurality of matrix modules configured for performing filtering operations comprising swelling operation and shrinking operation to the data based on a control signal, the plurality of matrix modules serially connected, and a first one of the series being connected to the reader;
a selector configured for selecting one of the plurality of matrix modules based on the control signal and outputting filtered results from the selected one of the plurality of matrix modules; and a controller configured for generating the control signal, the control signal comprising at least one upper bit for controlling the selector to select one of the plurality of matrix modules and at lest one lower bit for controlling the corresponding matrix module to perform swelling operation or shrinking operation correspondingly;

wherein the at least one upper bit compose a binary-coded decimal code for identifying each matrix module, and each bit of the at least one lower bits is used to control a corresponding matrix module to perform the swelling operation or shrinking operation correspondingly; the number of the plurality of matrix modules is 8, and the control signal has eleven bits in a SSS,XXXX,XXXX format, and the SSS is read by the selector to select one of the plurality of matrix modules, and each X is used to control a corresponding one of the plurality of matrix modules to perform the filtering operation.

2. The image processing apparatus according to claim 1, wherein each one of the plurality of matrix modules comprises a buffer for temporarily storing the data, and a processor for performing the filtering operation.

3. The image processing apparatus according to claim 2, wherein the buffer comprises a series of registers, and each register is used for temporarily storing data of a pixel and sending the data to a next register.

4. The image processing apparatus according to claim 3, wherein the number of the registers equals two plus the total number of pixels of two rows of the binarized image when a 3*3 window is used to process the binarized image.

5. The image processing apparatus according to claim 3, wherein the number of the registers equals three plus the total number of pixels of two rows of the binarized image when a 3*3 window is used to process the binarized image.

6. The image processing apparatus according to claim 1, wherein each one of the plurality of matrix modules comprises a first memory and a second memory, and the first memory and the second memory each is used for temporarily storing data of a group of pixels of the binarized image.

7. The image processing apparatus according to claim 6, wherein the number of pixels of the group equals one plus the total number of pixels of a row of the binarized image.

8. The image processing apparatus according to claim 6, wherein the each one of the plurality of matrix modules also comprises a first group of registers serially connected between the reader and the processor, a second group of registers serially connected between the first memory and the processor, and a third group of registers serially connected between the second memory and the processor.

9. The image processing apparatus according to claim 8, wherein the first memory and the second memory are serially connected between the processor and a first register of the first group of registers.

10. An image processing method comprising:
reading data of a plurality of pixels of a binarized image one by one;
delaying the data of the plurality of pixels and outputting the data at the same time;
providing a control signal comprising at least one upper bit and at least one lower bit, wherein the at least one upper bit compose a binary-coded decimal code for identifying each matrix module, and each bit of the at least one lower bits is used to control a corresponding matrix module to perform the swelling operation or shrinking operation correspondingly; the number of the plurality of matrix modules is 8, and the control signal has eleven bits in a SSS,XXXX,XXXX format, and the SSS is read by the selector to select one of the plurality of matrix modules, and each X is used to control a corresponding one of the plurality of matrix modules to perform the filtering operation;
selecting one of the plurality of matrix modules according to the at least one upper bit of the control signal;
performing swelling operation or shrinking operation to the data of a matrix of pixels of the plurality of pixels correspondingly according to the at least one lower bit of the control signal; and
outputting filtered results.

11. The image processing method according to claim 10, further comprising:
displaying the processed binarized image based on the filtered results to users.

12. The image processing method according to claim 10, wherein the matrix of pixels uses a 3*3 window standard.

13. An image processing apparatus comprising:
a reader configured for reading data of each pixel of a binarized image;
a plurality of matrix modules configured for performing filtering operations to the data based on a control signal, the plurality of matrix modules serially connected, and a first one of the series being connected to the reader;
a selector configured for selecting one of the plurality of matrix modules based on the control signal and outputting filtered results from the selected one of the plurality of matrix modules; and a controller configured for generating the control signal, the control signal comprising at least one upper bit for controlling the selector to select one of the plurality of matrix modules and at lest one lower bit for controlling the corresponding matrix module to perform swelling operation or shrinking operation correspondingly, wherein the at least one upper bit compose a binary-coded decimal code for identifying each matrix module, and each bit of the at least one lower bits is used to control a corresponding matrix module to perform the swelling operation or shrinking operation correspondingly; the number of the plurality of matrix modules is 8, and the control signal has eleven bits in a SSS,XXXX,XXXX format, and the SSS is read by the selector to select one of the plurality of matrix modules, and each X is used to control a corresponding one of the plurality of matrix modules to perform the filtering operation;
wherein each matrix module comprises a buffer and a processor, the buffer is used for temporarily storing a plurality of data composed a M*M window from the reader and sending to the plurality of data to the processor such that the processor can perform the filtering operating to the plurality data at the same time.

14. The image processing apparatus as claimed in claim 13, wherein the buffer comprises a series of registers, and each register is used for temporarily storing data of a pixel and sending the data to a next register.

15. The image processing apparatus according to claim 14, wherein the number of the registers equals two plus the total number of pixels of two rows of the binarized image when a 3*3 window is used to process the binarized image.

16. The image processing apparatus according to claim 14, wherein the number of the registers equals three plus the total number of pixels of two rows of the binarized image when a 3*3 window is used to process the binarized image.

* * * * *